United States Patent [19]

Reese et al.

[11] Patent Number: 4,696,321
[45] Date of Patent: Sep. 29, 1987

[54] AIR RELEASE AND VACUUM BREAKER VALVE SYSTEM

[75] Inventors: James R. Reese; William Yelich, both of Costa Mesa, Calif.

[73] Assignee: Cla-Val Company, Costa Mesa, Calif.

[21] Appl. No.: 858,666

[22] Filed: May 2, 1986

[51] Int. Cl.[4] .................... F16K 33/00; F16K 31/20
[52] U.S. Cl. .................................. 137/202; 137/430; 251/80
[58] Field of Search ................ 137/202, 430; 251/80

[56] References Cited

U.S. PATENT DOCUMENTS

| | | |
|---|---|---|
| 257,853 | 5/1882 | Dibble . |
| 557,343 | 3/1896 | Schierholz . |
| 2,138,069 | 11/1938 | Nicholas .................. 137/202 X |
| 2,179,750 | 6/1938 | McCracken ................ 137/69 |
| 2,812,772 | 11/1957 | Moore ...................... 137/202 |
| 2,849,016 | 8/1958 | Nations .................... 137/202 |
| 2,853,092 | 9/1958 | Klikunas ................... 137/202 |
| 2,931,377 | 4/1980 | Nations .................... 137/202 |
| 3,233,863 | 2/1966 | Bowen et al. ............... 251/210 |
| 3,599,659 | 8/1971 | Nuter ...................... 137/202 |
| 3,893,475 | 7/1975 | Hudson ..................... 137/414 |
| 4,209,032 | 6/1980 | Drori ...................... 137/202 |
| 4,373,550 | 2/1983 | Yelich ..................... 137/516.29 |

FOREIGN PATENT DOCUMENTS 6783 of 1894 United Kingdom .
1571449 7/1980 United Kingdom .................. 31/22

OTHER PUBLICATIONS

Exhibits 1 through 11-pages from APCO Corporation catalogues.

Primary Examiner—Alan Cohan
Attorney, Agent, or Firm—Gausewitz, Carr & Rothenberg

[57] ABSTRACT

A combined air release and vacuum breaker valve for pipelines has a ball float that acts directly upon both the vacuum breaker and air release valves which are concentric with one another and axially aligned with the ball float. To avoid adverse effects of high velocity flow of water into the float chamber, which tends to initially counteract buoyancy of the ball, a flow disturbing screen is connected to the lower end of the ball. The direct acting ball is connected to the pressure release valve member by means of a resilient lost motion connection, so that slight bouncing of the ball caused by turbulent flow in adjacent areas of the pipeline will not cause the air release valve member to bounce on and off its seat.

19 Claims, 6 Drawing Figures

AIR RELEASE AND VACUUM BREAKER VALVE SYSTEM

BACKGROUND OF THE INVENTION

The present invention relates to valve systems that provide vacuum breaker or air release action or a combination of the two, and more particularly concerns such a valve system having improved response of the float in the presence of high velocity flow of liquid into the float chamber, and in which sensitivity of the pressure release valve to small variations of ball float position is decreased.

Valve systems are employed in pipelines to handle a number of conditions including air release, air pocket accumulation and lowered internal pressure. These conditions may arise during operations referred to in the following discussion.

Pipelines having varying elevations include high points of the line at which air collects either when the pipe is initially filled or over a period of time during operation of the pipe. For example, when a pipeline for flowing water is initially filled, air in the pipe must be released at the several high points in order to eliminate air pockets that may obstruct water flow. Further, after the pipe has been in operation for a period of time, bubbles of air in the water tend to collect at high points, displacing water from the pipeline at such points, and accumulating to an extent that will impede or block the water flow. Such air pockets may be under considerable pressure, which is equal to the pressure of the system liquid, and for release of such air a relief valve must be operable against or in the presence of this accumulated pressurized air. Under other conditions, such as, for example, when flow through a pipeline is shut off, pressure in the line may decrease, causing a negative pressure which can reach values that may cause collapse of the pipe. Thus it is common to install in a water pipline, for example, valves which permit release of undesired high pressure, permit release of air when the line is being filled, and admit ambient air when line pressure decreases.

Combined vacuum breaker and air release valves that are presently employed incorporate a relatively large area vacuum breaker valve and a relatively small area air release valve. When the system is empty, both valves of such a combination system are open with movable valve members being in a lower position from which they are movable upwardly to close the various orifices. As the system is filled, water rushes into the valve chamber, flowing around a float, which is generally a sphere, until the float rises to a point at which the valves are driven upwardly to closed position. It is found that in some circumstances when water flows into the float chamber of a valve of this kind, the ball float does not immediately rise in response to buoyant forces exerted by the increasing level of the water. On the contrary, in many situations, depending upon velocity of the incoming water, the ball will initially remain in a lower position in the float chamber and, only after water level in the chamber has risen to a significant extent, the ball will suddenly rise at high speed and cause the valve members to slam shut. This rapid and abrupt closing of the valves is undesirable, tending to be destructive of the system, as it may create excess stress and forces on the valve members and pipe.

In normal operation of a pipe system with an air release valve controlled by a ball float, liquid in the pipeline adjacent to the valve is occasionally subject to turbulence. In many conditions, particularly where the ball float chamber is only partly filled with water so that the ball is floating at an intermediate position, turbulent flow of water in the adjacent pipe is transmitted to the water within the chamber. The water in the chamber then experiences a relatively rapid fluctuation in level. As the water level moves up and down rapidly due to the disturbed flow, the float also moves up and down, experiencing small vertical perturbations. If the air release valve is seated, this vertical perturbation or bouncing of the ball float causes the valve member to oscillate rapidly through a small distance between open and closed positions and may cause water to be expelled from the valve, thus producing what is effectively a turbulence induced leakage.

Accordingly, it is an object of the present invention to provide a valve system that avoids or minimizes above mentioned problems.

SUMMARY OF THE INVENTION

In carrying out principles of the present invention in accordance with a preferred embodiment thereof, the ball float of a float actuated valve is provided with means on its lower surface to induce turbulent flow along such lower surface. More specifically, in accordance with an embodiment of the invention, an area at the lower most portion of a ball float is provided with a flow disturbing surface that prevents smooth laminar flow of water along the lower surface.

According to another feature of the invention, the air release valve member is resiliently urged against its seat, and a lost motion connection is provided between the air release valve member and the ball float so as to effectively isolate the air release valve member from small vertical excursions of the ball float that may be caused by turbulence in the flowing water.

DETAILED DESCRIPTION OF THE INVENTION

Figure 1:
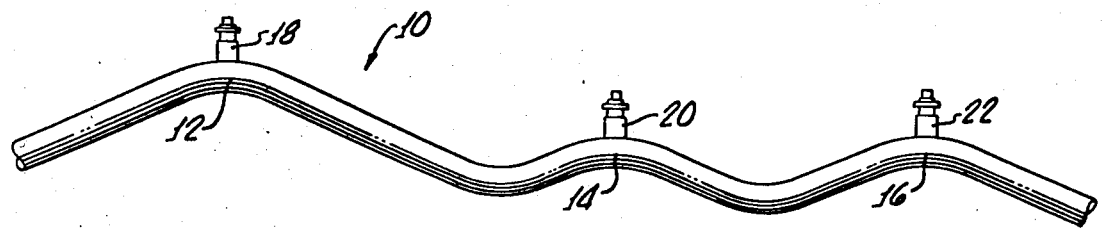
FIG. 1 schematically illustrates a water pipeline of varying elevations having installed at several of its high points a combination vacuum breaker and air release valve employing the principles of the present invention.

Schematically illustrated in FIG. 1 is an elevation view of an exemplary pipe line generally indicated at 10, and having elevation peaks at areas indicated at 12, 14 and 16. At each of these elevation peaks air may accumulate and, as previously mentioned, must be released before the amount of air in the air section of the pipe becomes so large as to impede flow. Also, if pressure of liquid in the pipe decreases, air must be admitted to the interior of the pipe to avoid possibly destructive low pressure. As a third situation to be handled by a valve system, upon filling of the pipe, air contained within the pipe must be vented and the high elevation points are effective locations to accomplish this end. Accordingly, at each of the high elevation points, such as 12, 14 and 16, a combination vacuum breaker and air pressure release valve 18, 20 and 22 is positioned. Each of the valves is identical to the others and only one need be described.

Figure 2:
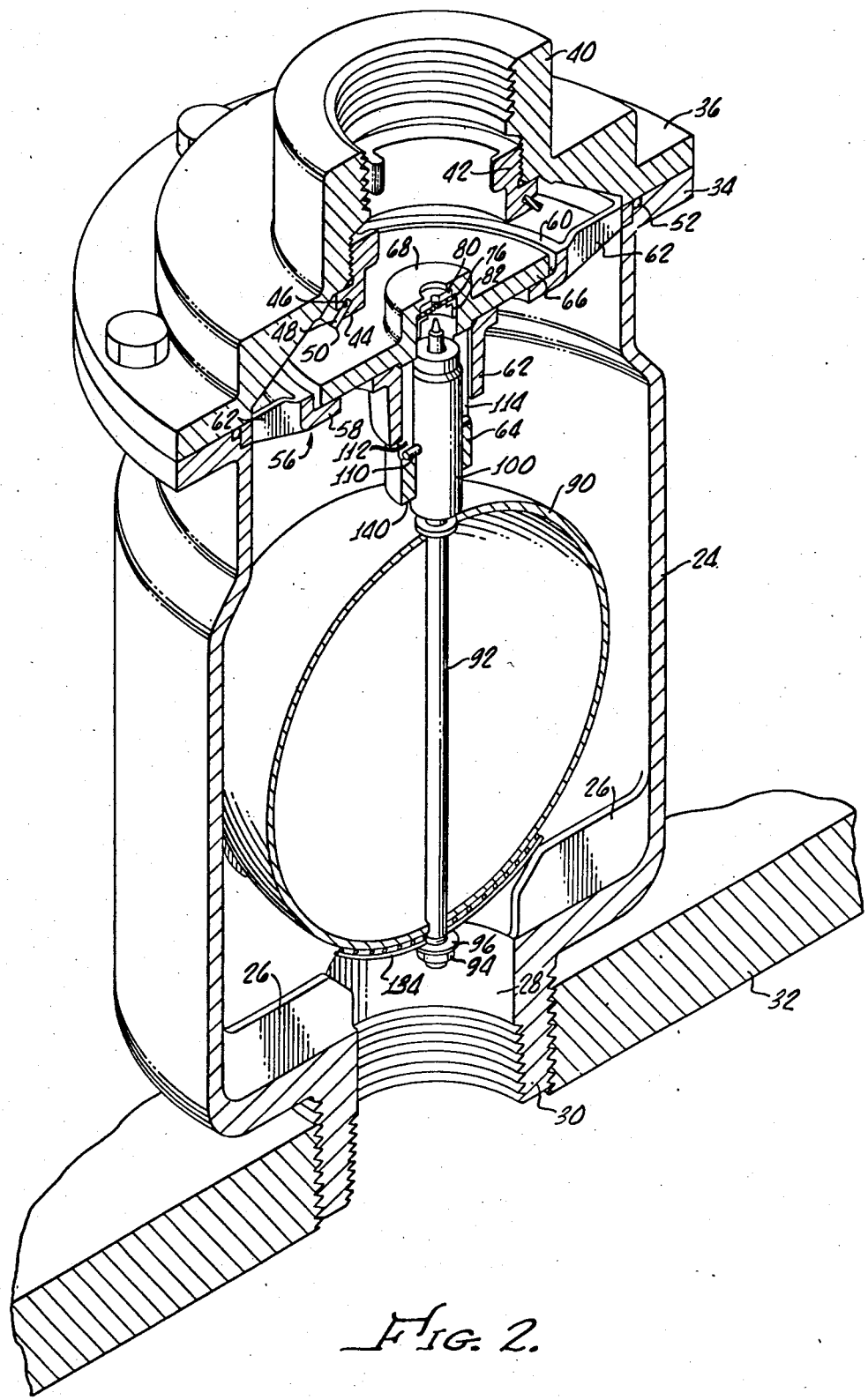
FIG. 2 is a perspective view, with parts cut away, showing a valve embodying principles of the present invention connected to a pipe.

As illustrated in FIG. 2, a valve system embodying principles of the present invention incorporates a valve body 24 having a plurality of stiffening ribs 26 at a lower portion there of on opposite sides of an inlet port 28, and having a valve body connecting nipple 30 externally threaded and threadedly engaged in a suitable aperture formed in a pipe 32, of which only a small section of one wall is illustrated in FIG. 2. Obviously the valve body may be connected to a suitable nipple or other fitting on the pipe, rather than directly to the pipe itself. Valve body 24 is upright, having an open upper end terminating in a peripheral flange 34 to which is securely bolted a valve body cover 36 having an air output nipple 40 that is open to ambient atmosphere. An annular vacuum breaker valve seat 42 is threaded tightly into and therefor fixedly connected to the interior of the nipple 40 and includes a generally horizontally disposed downwardly facing flat valve seat surface 44, having a peripheral frustoconical groove 46 formed therein and extending downwardly and outwardly at a lower and outer corner of the valve seat. Resiliently captured within and secured to the groove 46 is an annular elastomeric ring seal 48 which in unstressed condition has a flat annular configuration, but is stretched and distorted to be resiliently secured to and within the groove in such a fashion that a forward outer edge 50 extends downwardly (in the valve open position of FIG. 6), below the surface 44, to provide at the corner of the downward edge of the ring seal 48 a line contact for sealing against a valve disc member 66.

Fixed to and between the flange 34 and cover 36 (FIG. 2), and sealed thereto by means of an O ring 52, is a vacuum breaker valve disc holder 56 having a shallow dish shaped flat annular portion 58, terminating in an upstanding peripheral flange 60, and integrally connected with a radially outwardly extending connecting section 62 that is captured between and thereby secured to the flange 34 and cover 36. Integrally formed with and projecting downwardly from the dish shaped holder portion 58 is a hollow holder stem 62 in which is slidably received a hollow vacuum breaker guide stem 64. The latter is integrally formed with and projects downwardly from the central portion of a vacuum breaker valve disc 66 having an upwardly projecting centrally located hub portion 68. Hub portion 68 is formed with a downwardly opening central bore 70 (FIG. 4) which communicates with decreased diameter bore portions 72, 74 positioned in the hub 68 above the bore 70. Mounted in the upper end of bore 70 is an air release valve member disc seat 76 having an orifice 78 and which is interposed between an apertured disc support washer 80, positioned above the disc seat 76 in bore 72, and an inverted cup shaped disc retainer 82 mounted as a tight fit within the bore 70 below the disc seat 76.

Positioned within the float chamber defined within the interior of the body 24 is a hollow spherical float 90 (FIGS. 2, 4 and 5) having a shaft 92 extending therethrough and fixed to the ball by means of a nut 94 and washer 96 on the lower end of the shaft and being fixed at the upper end of the shaft to a cylindrical float connector 98.

A hollow needle guide sleeve 100 (FIG. 6), having an upper end 102 with a needle valve opening 104 therein, is slidably mounted in the guide stem 64 and connected to the guide stem and the float connector 98 by means of a pin 110 fixed to and extending transversely through an upper portion of the connector 98 and through corresponding close fitting apertures in opposite sides of sleeve 100. Pin 110 extends into loose sliding engagement with first and second slots 112, 114 vertically extending in diametrically opposed positions of guide stem 64, to provide a lost motion correction between the guide stem and guide sleeve.

A needle valve member, generally indicated at 120, includes a needle valve guide body 122, having a longitudinally extending recess opening to the bottom of the body and laterally outwardly stepped to form a peripheral downwardly facing spring retaining shoulder 124, is integrally formed with a needle valve shaft 126 having a tapered valve tip 128 adapted to seat within and close the orifice 78 of the needle valve seat disc 76. Captured between the upper end of float connector 98 and the downwardly facing annular shoulder 124 is a compressed spring 125 that tends to urge the needle valve 120 upwardly toward its position of seating engagement in the orifice of the needle valve disc 76.

Figure 3:
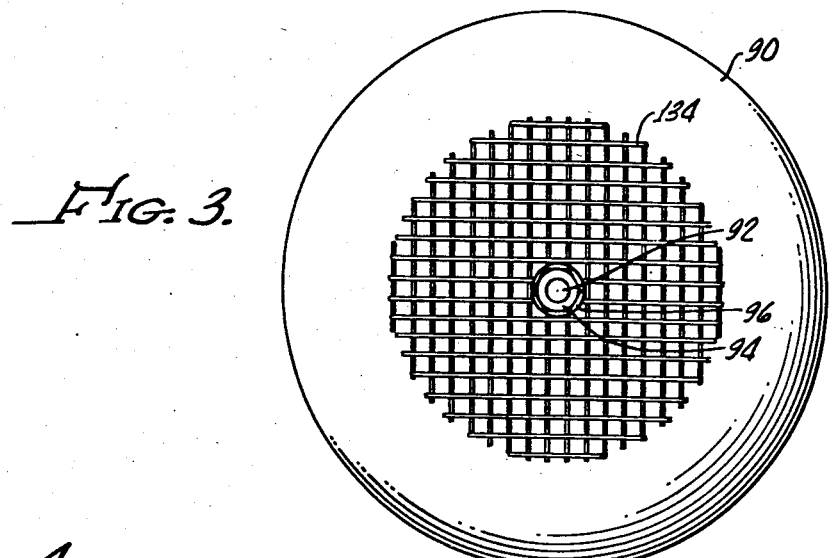
FIG. 3 is a view of the bottom of the ball float of the valve of FIG. 2, showing the flow disturbing member attached thereto.

As seen in FIGS. 2 and 3, a flow disturbing or turbulence inducing member 134 is securly attached to the lowermost surface of the hollow ball float 90, being firmly secured between washer 96 and the external surface of the lower portion of the ball. Member 134 provides a rough surface, in a presently preferred embodiment taking the form of a section of reticulated material such as a conventional woven wire or other screen material that is held by the nut 94 and washer 96 tightly against the exterior of the lower portion of the ball float. The screen material extends for a distance (subtending a solid angle of about 80° of arc in a presently preferred embodiment) from the lower most part of the ball float, that is, from the lower end of shaft 92 and throughout its area is contiguous to the ball surface. Inherent stiffness of the screen section 134 enables this member to maintain its position close to the exterior surface of the ball throughout the extent of the screen section while being secured solely by the nut and washer.

Figure 6:
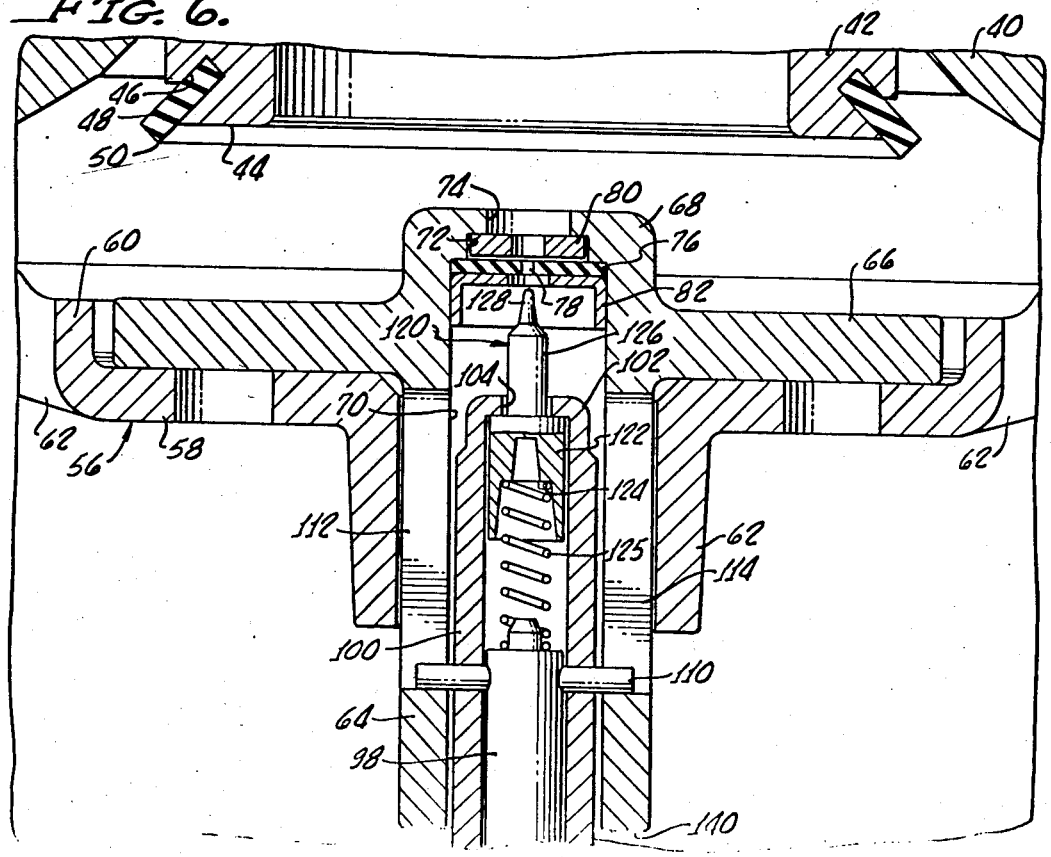

In operation, assuming the pipe 32 is initially empty and is being filled with liquid, the valve system has all of its components in the lowermost position, as illustrated in FIG. 6 with the vacuum breaker valve disc 66 resting upon the upper surface of the horizontal holder disc portion 58, whereby the vacuum breaker valve is open. Ball 90 is in a lowermost position, together with the sleeve 100 and connector 98 which are fixed thereto. Connecting pin 110 is positioned at a lower portion of the slots 112, 114 whereas the needle valve is at an uppermost position relative to sleeve 100. The needle valve is held in this uppermost position (with the air release valve open), with the upper portion of needle valve member body 122 abutting the inner surface of the upper end of the sleeve, by the urging of the resilient compression spring 125. As the pipe line is filled, liquid reaches an upper point of the pipeline at which the valve assembly illustrated in the drawings is positioned. Air in the line flows out through the open valve and water then enters the inlet port 28 of the valve. As the water enters it impinges upon the lower surface of the ball float, is redirected to flow around the ball and begins to fill the float chamber within the body 24. Assuming, for purposes of explanation, that the flow disturbing member 134 is entirely omitted, the water flowing into the chamber flows along the smooth outer surface of the lower portion of the ball, flowing with a high velocity substantially laminar flow. This high velocity flow at the surface of the bottom of the ball creates an area of decreased pressure at the bottom of the ball which tends to exert a downward force on the ball. With velocities of flow of liquid entering the float chamber that are commonly encountered, this decreased pressure and the downward force that it creates are sufficient to hold the ball and all of the elements attached thereto in the illustrated lowermost position for a time after water has filled the float chamber to a point where buoyancy of the ball is sufficient to overcome the weight of the ball and elements connected thereto. In other words, the ball remains in its lowermost position even though, in the absence of this decreased pressure at its bottom, it would normally tend to rise with the water level because of its inherent buoyancy. As water level continues to rise within the float chamber, the upwardly directecd buoyant force of the ball increases, and at some time will be sufficient to overcome the combination of downwardly directed forces including the weight of the ball and connected components together with the force caused by negative pressure of the high velocity water flow. At this point (still assuming that there is no screen section or equivalent at the bottom of the ball) the ball will suddenly respond to the buoyant force, breaking loose from the grasp of the downwardly directed negative pressure force and will rise with great rapidity, causing the valve members to slam shut. This sudden closing of the valve members creates highly undesirable excessive forces on the valve and pipe.

With the described flow disturbing member 134 secured to the bottom of the ball, however, the force due to decreased pressure that tends to hold the ball against its upwardly directed buoyant force is avoided or significantly decreased so that the ball will begin to rise together with the rise of water level within the float chamber. The ball will not be subjected to the negative pressure of high velocity flow and will not experience the sudden vertical rise, whereby the valve members will close slowly and gently.

As the water level rises within the float chamber during initial filling of the pipeline, buoyancy of the ball float raises the ball and the sleeve 100 by means of its connection to float connector 98 to a point at which the upper tip 128 of the valve member 120 seats in the seating disc 76 to close this air release orifice. This closing of the air release orifice occurs before the upper surface of the ball contacts the lowermost ends 140 of the guide stem 64.

Figure 4:
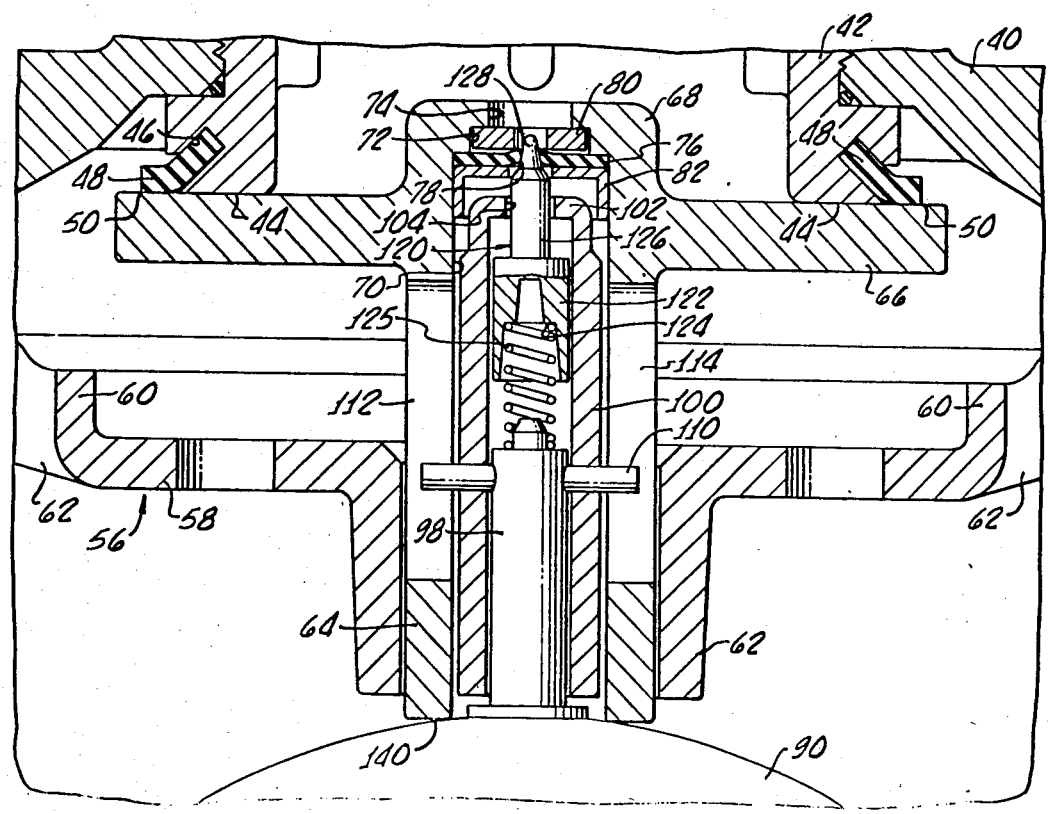
FIG. 4 is an enlarged vertical sectional view showing portions of the valve system of FIG. 2 in closed position, with the float in uppermost position.

As the water level continues to rise and the ball 90, sleeve 64 and valve member 120 rise with the ball, the vacuum breaker valve disc 66 is raised by means of its contact with the needle valve 120 because the compressive force exerted by spring 125 is approximately equal to the weight of the vacuum breaker valve disc and stem together with the needle valve. If the force of the spring is not sufficiently great, the lower end 140 of stem 64 abuts the upper surface of the rising ball float and disc 66 is thus directly lifted by the ball, until, when the water has risen sufficiently, disc 66 contacts ring seal 48 to seal the vacuum opening defined by the seat 42. FIG. 4 shows the valve in the position maintained when the float is in an upper position, with both vacuum breaker and air release valves closed.

With the valve system in its closed position, such as in the position of FIG. 4, for example, air bubbles in the water being conveyed by the pipe tend to accumulate within the higher elevation points of the pipe, and thus, during normal operation, air accumulates within the upper end of the float chamber. As the amount of air within the float chamber increases, the level of the water within the chamber decreases, and the float elevation decreases somewhat, although both vacuum breaker valve disc 86 and air release valve member 128 remain seated, with both valves still closed. When the level of water in the chamber decreases further, to a point at which the weight of the ball and components connected thereto is greater than the upward force exerted on needle valve 120 by the air pressure within the float chamber, the ball and sleeve 100 descend and draw the needle valve 120 downwardly to open the air release valve and thereby release the pressurized air from the interior of the float chamber.

Figure 5:
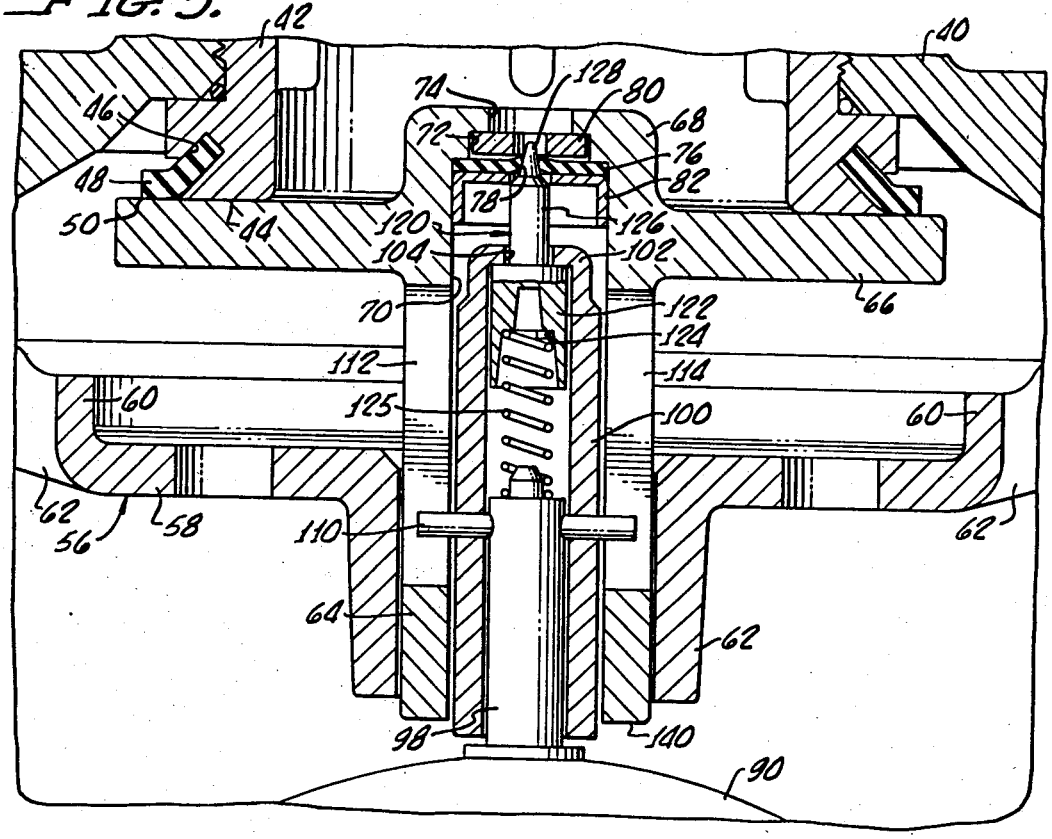
FIGS. 5 and 6 are views similar to FIG. 4, but showing the valve in different positions.

According to a feature of the present invention, the float ball is connected to the needle valve 120 by a lost motion connection which is created by the slidable mounting of the needle valve body 120 within the sleeve 100. This lost motion connection permits the needle valve body 122 to move relative to sleeve 100 between the closed position illustrated in FIG. 4 and a relatively low open position of the needle valve. The needle valve body is always urged toward its relatively uppermost position (relative to sleeve 100), as illustrated in FIG. 5, but will attain a relatively lower position (relative to the sleeve) when the vacuum breaker valve disc 66 is seated and the needle valve is also seated, and with the ball and sleeve in an upper position, as shown in FIG. 4.

When the ball is in an intermediate position (FIG. 5) between the completely open position shown in FIGS. 2 and 6 and the closed position of FIG. 4, but with both valves still closed, it is subject to rapid vertical perturbation or bouncing on the surface of the water within the float chamber if such surface should be disturbed. For example, if water flow within the pipe adjacent the described valve system becomes turbulent, some of this turbulent flow is transmitted to the water that partially fills the valve float chamber, causing small but rapid changes in the water level within the chamber. These small changes of water level will result in small changes of ball elevation. If the valve member 120 were to be tightly coupled to the ball, this valve member would partake of these small vertical fluctuations and would experience a bouncing motion. Such bouncing motion would cause the air release orifice to rapidly open and close, which would result in a squirting of water through this opening. However, because of the lost motion connection between the ball and needle valve member 120 together with the resilient urging of the needle valve member, the latter will remain seated, continually closing the air release orifice even in the presence of small vertical oscillations of the ball float.

Should pressure within the pipeline decrease, force due to pressure outside the valve may become greater than force due to pressure inside the valve (together with the upward force due to float byouancy), whereby the pressure differential across the vacuum breaker valve disc 66 will drive this disc downwardly to open the vacuum breaker valve, allowing the higher outside pressure to enter the valve system and pipe. This forestalls build up of a destructive low pressure within the pipe. As pressure within the pipe again builds up, only a small pressure differential across the disc 66 (tending to raise the disc) is sufficient to tightly close the vacuum breaker valve orifice by virtue of the line contact between the horizontal upper surface of the disc 66 and the circular sealing line formed by the downwardly and outwardly projecting edge 50 of the ring seal 48. Thus a good tight seal is formed at low differential pressure to minimize loss of water through the valve under such conditions.

As previously mentioned, a presently preferred embodiment of the disclosed vacuum breaker and air release valve employs a section of reticulated material fixed to and positioned closely adjacent the surface of the lower portion of the ball. In an exemplary embodiment, the material is a screen section made of 21 gauge stainless steel wire formed in ¼ inch mesh. A number of alternate arrangements for providing such a flow disturbing function are contemplated. Thus a portion of the lower surface of the ball itself may be suitable roughened, or a flow disturbing member comprising a sheet of material formed with a number of discontinuities or a number of very short outward projections extending for a small distance from the surface may be employed. It is important, however, that the flow disturbing member be positioned closely adjacent to the surface of the ball. Improved performance is achieved by causing the flow disturbing member to move together with the ball, that is, specifically, by being fixed to and closely adjacent to or in contact with the ball surface. It has been found that a flow disturbing member in the form of a deflector fixed to and across the input opening of the valve body, as distinguished from a flow disturbing member connected to and moving with the ball surface, is not effective to prevent the delay and the following rapid rise of the ball that causes the valve members to slam shut.

In addition to being useful at high points in the elevation profile of the pipeline, the described valve may be used in conjunction with a deep well pump, being connected to a discharge pipe section at the ground surface so that upon start up of the pump, air within the discharge pipe section may be readiy discharged to avoid interference with flow of the discharged liquid through the pipe.

There has been described a combination vacuum breaker and air release valve having a number of improved features including elimination of the rapid closing or slamming of the valve due to high velocity flow of water into the valve chamber, elimination of valve bounce due to turbulent flow and bouncing of the float, and the ability of the vacuum breaker valve to close and tightly seal in the presence of very small pressure differential across this valve.

The foregoing detailed description is to be clearly understood as given by way of illustration and example only, the spirit and scope of this invention being limited solely by the appended claims.

What is claimed is:

1. In an air release and vacuum breaker vacuum breaker valve having a valve body defining a float chamber and a chamber entrance, and having a float mounted in the chamber for vertical motion in accordance with the level of liquid in the chamber, said valve having valving elements connected to be operated to open or close the float chamber to ambient atmosphere in response to motion of said float within the chamber, and wherein liquid flowing at high velocity into said chamber through said chamber entrance tends to create a decreased pressure effect at a lower side of said float, thereby decreasing effective buoyancy of the float, whereby the float tends to rise suddenly and cause undesirably rapid closing of said valve elements as liquid in said chamber rises, the improvement comprising means on said float for attenuating the decreased pressure effect created by flow of liquid at high velocity into said chamber, said means comprising liquid flow disturbing means on said float positioned closely adjacent to and extending along the surface of a lower portion of said float.

2. In air release and vacuum breaker valve having a valve body defining a float chamber and a chamber entrance, and having a float mounted in the chamber for vertical motion in accordance with the level of liquid in the chamber, said valve having valving elements connected to be operated to open or close the float chamber to ambient atmosphere in response to motion of said float within the chamber, and wherein liquid flowing at high velocity into said chamber through said chamber entrance tends to create a decreased pressure effect at a lower side of said float, thereby decreasing effective buoyancy of the float, whereby the float tends to rise suddenly and cause undesirably rapid closing of said valve elements as liquid in said chamber rises, the improvement comprising means on said float for attenuating the decreased pressure effect created by flow of liquid at high velocity into said chamber, said means comprising liquid flow disturbing means on said float, said float comprising a ball, and said liquid flow disturbing means comprising a member having a rough surface, said member being secured to a lower side of said ball.

3. The valve of claim 2 wherein said member is formed of a reticulated material.

4. The valve of claim 2 wherein said member comprises a section of screening.

5. The valve of claim 2 wherein said member comprises a material having a number of apertures therein.

6. In an air release and vacuum breaker valve having a valve body defining a float chamber and a chamber entrance, and having a float mounted in the chamber for vertical motion in accordance with the level of liquid in the chamber, said valve having valving elements connected to be operated to open or close the float chamber to ambient atmosphere in response to motion of said float within the chamber, and wherein liquid flowing at high velocity into said chamber through said chamber entrance tends to create a decreased pressure effect at a lower side of said float, thereby decreasing effective buoyancy of the float, whereby the float tends to rise suddenly and cause undesirably rapid closing of said valve elements as liquid in said chamber rises, the improvement comprising means on said float for attenuating the decreased pressure effect created by flow of liquid at high velocity into said chamber, said means comprising liquid flow disturbing means on said float, said float comprising a buoyant sphere and said means for attenuating decreased pressure effect comprising flow disturbing means fixed to the bottom of said sphere and extending throughout an area substantially contiguous to the surface of said bottom for inducing turbulent flow along the bottom of said spehre.

7. The valve of claim 6 wherein said means for inducing turbulent flow comprises a screen section fixed to the bottom of said sphere.

8. The valve system of claim 1 wherein said valving elements comprise a valve seat mounted in said chamber, a valve member movable between a first position in which it seats in said valve seat to close the float chamber to ambient atmosphere and a second position in which the valve member is displaced from the valve seat, valve driving means connected to said float to move up and down with the float as level of liquid in said chamber varies, said valve driving means comprising a needle guide fixed to said float, said valve member being slidably mounted to said needle guide, and a spring interposed between said valve member and said needle guide for urging said valve member toward the valve seat.

9. The valve system of claim 8 wherein said needle guide comprises a hollow sleeve fixed to the float and having a closed upper end with an aperture extending therethrough, said valve member comprising a needle valve member guide body slidably mounted within said sleeve and a needle valve shaft fixed to said needle valve member guide body and extending through said sleeve aperture for engagement with said valve seat, said spring being mounted within said sleeve and having one end pressed against said needle valve member guide body.

10. In an air release and vacuum breaker valve having a valve body defining a float chamber and a chamber entrance, and having a float mounted in the chamber for vertical motion in accordance with the level of liquid in the chamber, said valve having valving elements connected to be operated to open or close the float chamber to ambient atmosphere in response to motion of said float within the chamber, and wherein liquid flowing at high velocity into said chamber through said chamber entrance tends to create a decreased pressure effect at a lower side of said float, thereby decreasing effective buoyancy of the float, whereby the float tends to rise suddenly and cause undesirably rapid closing of said valve elements as liquid in said chamber rises, the improvement comprising
means on said float for attenuating the decreased pressure effect created by flow of liquid at high velocity into said chamber, said means comprising liquid flow disturbing means on said float,
said valving elements comprising
a valve seat mounted in said chamber,
a valve member movable between a first position in which it seats in said valve seat to close the float chamber to ambient atmosphere and a second position in which the valve member is displaced from the valve seat,
valve driving means connected to said float to move up and down with the float as level of liquid in said chamber varies, said valve driving means comprising
a needle guide fixed to said float, said valve member being slidably mounted to said needle guide,
a spring interposed between said valve member and said needle guide for urging said valve member toward the valve seat,
said needle guide comprising a hollow sleeve fixed to the float and having a closed upper end with an aperture extending therethrough, said valve member comprising a needle valve member guide body slidably mounted within said sleeve and a needle valve shaft fixed to said needle valve member guide body and extending through said sleeve aperture for engagement with said valve seat, said spring being mounted within said sleeve and having one end pressed against said needle valve member guide body,
a vacuum breaker valve having a vacuum breaker valve disc and a breaker valve guide stem fixed to the disc and projecting downwardly therefrom,
a vacuum breaker valve holder fixedly mounted in said chamber and having an internal bore slidably receiving said breaker valve guide stem, said guide stem having a vertically elongated slot, said valve driving means comprising
a connector fixed to said float and to said needle guide hollow sleeve,
guide connector means extending from said needle into said vacuum breaker valve guide stem slot for providing a lost motion connection between said float and vacuum breaker valve disc and stem,
said vacuum breaker valve disc having a valve opening therein, said valve seat being mounted to said valve opening of said vacuum breaker valve disc, and
a vacuum breaker valve seat fixedly mounted within said valve body, said vacuum breaker valve seat comprising
an annular seat element having a flat seating surface and a downwardly and outwardly facing frustoconical groove in said seating surface extending around the periphery thereof, and
a resilient ring sealing member having a flat annular configuration in unstressed condition, said ring sealing member having an inner edge thereof stretched and captured in an upper end of said groove and having an outer peripheral edge thereof extending below said seating surface of said vacuum breaker valve seat.

11. An air release and vacuum breaker valve system comprising
a valve body defining a float chamber, said body having a first opening adapted to be connected to a pipe from which air is to be released and having a second opening in an upper portion of said body for releasing air from said chamber
a valve seat mounted in the chamber at said second opening,
a valve element movable between a first position in which it seats in said valve seat to close said valve and a second position in which said valve member is displaced from the valve seat,
a float mounted in said chamber, and
anti-bounce means for causing said valve element to move between said first and second positions in response to relatively large vertical displacement of said float and to remain in said first position independent of relatively small vertical displacement of said float, said anti-bounce means comprising
valve driving means connected to said float to move up and down with the float as level of liquid in the chamber varies, and
resilient means interconnected between said valve driving means and said valve element for urging said valve element from the valve driving means toward the valve seat, said valve driving means comprising a needle guide fixed to said float, said valve element being slidably mounted to said needle guide, said resilient means including a spring interposed between said valve element and said needle guide for urging said valve element toward the valve seat, and guide means fixed to said valve seat for guiding the needle guide relative to said valve seat.

12. The valve system of claim 11 wherein said needle guide comprises a hollow sleeve fixed to the float and having a closed upper end with an aperture extending therethrough, said valve element comprising a needle valve member guide body slidably mounted within said sleeve and a needle valve shaft fixed to said needle valve member guide body and extending through said sleeve aperture for engagement with said valve seat, said spring being mounted within said sleeve and having one end pressed against said needle valve member guide body.

13. An air release and vacuum breaker valve system comprising
   a valve body defining a float chamber, said body having a first opening adapted to be connected to a pipe from which air is to be released and having a second opening in an upper portion of said body for releasing air from said chamber
   a valve seat mounted in the chamber at said second opening,
   a valve element movable between a first position in which it seats in said valve seat to close said valve and a second position in which valve member is displaced from the valve seat,
   a float mounted in said chamber, and
   anti-bounce means for causing said valve element to move between said first and second positions in response to relatively large vertical displacement of said float and to remain in said first position independent of relatively small vertical displacement of said float, said anti-bounce means comprising
      valve driving means connected to said float to move up and down with the float as level of liquid in the chamber varies, and
      resilient means interconnected between said valve driving means and said valve element for urging said valve element from the valve driving means toward the valve seat, said valve driving means comprising a needle guide fixed to said float, said valve element being slidably mounted to said needle guide, said resilient means including a spring interposed between said valve element and said needle guide for urging said valve element toward the valve seat, said needle guide comprising a hollow sleeve fixed to the float and having a closed upper end with an aperture extending therethrough, said valve element comprising a needle valve member guide body slidably mounted within said sleeve and a needle valve shaft fixed to said needle valve member guide body and extending through said sleeve aperture for engagement with said valve seat, said spring being mounted within said sleeve and having one end pressed against said needle valve member guide body,
   a vacuum breaker valve having a vacuum breaker valve disc and a breaker valve guide stem fixed to the disc and projecting downwardly therefrom,
   a vacuum breaker valve holder fixedly mounted in said chamber and having an internal bore slidably receiving said breaker valve guide stem, said guide stem having a vertically elongated slot, said valve driving means comprising a connector fixed to said float and to said needle guide,
   guide connector means extending from said needle guide into said vacuum breaker valve guide stem slot for providing a lost motion connected between said float and vacuum breaker valve disc and stem, said vacuum breaker valve disc having a valve opening therein, said valve seat being mounted to said valve opening of said vacuum breaker valve disc, and
   a vacuum breaker valve seat fixedly mounted within said valve body, said vacuum breaker valve seat comprising an annular seat element having a flat seating surface and a downwardly and outwardly facing frustoconical groove in said seating surface extending around the periphery thereof, and a resilient ring sealing member having a flat annular configuration in unstressed condition, said ring sealing member having an inner edge thereof stretched and captured in an upper end of said groove and having an outer peripheral edge thereof extending below said seating of said vacuum breaker valve seat.

14. an air release and vacuum breaker valve system comprising
   a valve body defining a float chamber, said body having a first opening adapted to be connected to a pipe from which air is to be released and having a second opening in an upper portion of said body for releasing air from said chamber
   a valve seat mounted in the chamber at said second opening,
   a valve element movable between a first position in which it seats in said valve seat to close said valve and a second position in which valve member is displaced from the valve seat,
   a float mounted in said chamber, and
   anti-bounce means for causing said valve element to move between said first and second positions in response to relatively large vertical displacement of said float and to remain in said first position independent of relatively small vertical displacement of said float, said anti-bounce means comprising
      valve driving means connected to said float to move up and down with the float as level of liquid in the chamber varies, and
      resilient means interconnected between said valve driving means and said valve element for urging said valve element from the valve driving means toward the valve seat, including flow disturbing means on a portion of a lower surface of said float and extending along and closely adjacent said surface for causing turbulence in flow of liquid flowing into said float chamber through said first opening and along the lower surface of said float.

15. The valve system of claim 13 including a flow disturbing member fixed to said float and extending along and closely adjacent to the outer surface of a lower portion of said float.

16. The valve system of claim 15 wherein said flow disturbing member comprises a section of screen material.

17. A combined vacuum breaker and air release valve comprising a valve body defining a float chamber having an inlet at lower portion thereof adapted to be connected to a pipe in which liquid flows and having an outlet at an upper portion thereof for permitting flow of air between said valve body float chamber and ambient atmosphere, a vacuum breaker valve holder fixed to said valve body and extending across said float chamber, said holder having an annular horizontally disposed portion and an integral vertically disposed holder stem, said stem having a stem bore, a vacuum breaker valve comprising a horizontally disposed disc having a central hub portion at an upper side thereof and having a depending vacuum breaker valve guide stem extending downwardly therefrom and slidably received within said stem bore, said guide stem having a pair of oppositely disposed vertically extending slots therein, a valve cover fixed to said valve body and having said outlet formed therein, a vacuum breaker valve seat element fixed to said valve cover, said vacuum breaker valve seat element comprising an annular seat member having a downwardly facing and horizontally disposed valve seat surface adapted to cooperate with an upper surface of said vacuum breaker valve disc for sealing said outlet, said disc hub portion having an air release aperture therein, and an air release valve seat mounted to said hub portion, said air release valve seat having an air release orifice, a float positioned in said chamber below said holder stem, a guide sleeve slidably mounted within said vacuum breaker valve guide stem, a float connector fixed to the float and extending upwardly into a lower portion of said guide sleeve, a connector pin fixed to said float connector and extending through said guide sleeve into said guide stem slots, said guide sleeve having a closed upper end with a valve member opening therein, an air release valve member having a valve shaft extending through said valve member opening and having an upper end adapted to seat upon said air release valve seat to seal said air release orifice, said air release valve member having a wire guide body slidably mounted to and captured within said guide sleeve, said valve guide body being fixedly connected to said valve shaft, and a spring interconnected between said float connector and said valve guide body for urging said valve shaft upwardly relative to said guide sleeve.

18. The valve system of claim 17, wherein said float comprises a ball and means for causing turbulence in flow of liquid along the surface of a lower portion of said ball.

19. The valve system of claim 18 wherein said means for causing turbulence comprises a reticulated member fixed to the ball at a lower end thereof, extending along the surface of said ball from the lowermost point of said ball.

* * * * *